Feb. 24, 1948. A. FROSCH 2,436,563
WELL LOGGING
Filed Dec. 27, 1941 2 Sheets-Sheet 2

Alex Frosch INVENTOR.
BY P. J. Whelan
ATTORNEY

Patented Feb. 24, 1948

2,436,563

UNITED STATES PATENT OFFICE 2,436,563

WELL LOGGING

Alex Frosch, Houston, Tex., assignor to Standard Oil Development Company, a corporation of Delaware Application December 27, 1941, Serial No. 424,573

4 Claims. (Cl. 175—182)

The present invention is directed to a method for logging boreholes.

The principal object of the present invention is the provision of a well-logging method by which it is possible to record at the surface a number of values constituting measurements of various properties in the borehole, which are transmitted to the surface over a single conductor.

It has already been proposed to transmit signals from the inside of the borehole to the surface over a single conductor by utilizing the values to be measured to control the outputs of oscillators, the same in number as the values to be measured, and transmitting the outputs of the oscillators, being suitably selected with regard to the frequency ranges, through a single conductor to the surface. An object of the present invention is to achieve this result while using a single oscillator.

Further objects and advantages of the present invention will appear from the accompanying drawing, in which—

Figure 1:
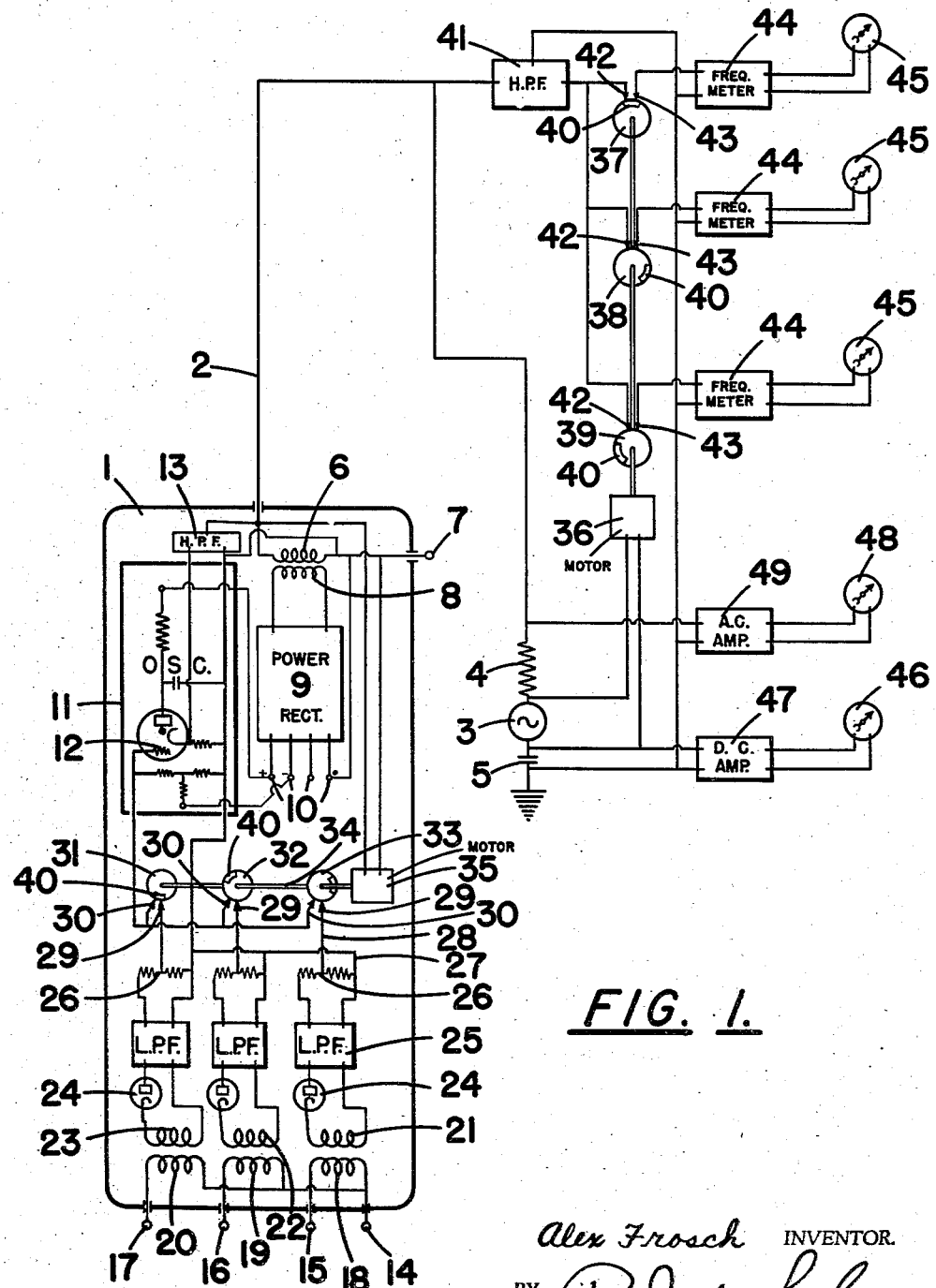
Figure 1 is a schematic view of the circuits utilized in the borehole chamber and at the surface in one embodiment of the present invention.

Referring to Figure 1 in detail, numeral 1 designates a casing suspended on a cable 2. The casing will ordinarily be made of metal coated with an insulating material, such as Bakelite. Arranged on the surface of the casing there will ordinarily be bands of conducting material used as outlets for current to be passed into the formation, and as probes for picking up voltages in the borehole. These bands are connected electrically to the circuit inside the chamber. The cable 2 is a single conductor cable having a steel armor. In practice it is trained over a sheave arranged at the mouth of the borehole at the surface, and the sheave is geared or otherwise connected to the recording mechanism used at the surface in such a way as to drive the record strip whereby on the record the measurements will be correlated with depth.

In the particular embodiment shown in Figure 1 provision is made for the simultaneous measurement of natural earth potential, single electrode impedance, and the voltage differences between three different pairs of electrodes of different spacing, these voltage differences being created in the formation by the alternating current supplied.

At the surface, conductor 2 is connected to the output of an alternator 3 through a resistance 4, which has a value so great with respect to the earth resistance that the current in line 2 will remain substantially constant. The other outlet terminal of the alternator is connected to the ground through a condenser 5, which is provided for the purpose hereinafter specified. In the chamber the conductor 2 is connected to one terminal of a primary winding 6 of a transformer, the other terminal of which is connected to a conducting ring 7, arranged on the outside of the chamber. It is through this conducting ring that the current is supplied to the formations.

The secondary 8 of the transformer has its terminals connected to a rectifier 9, which is provided with a plurality of takeoff taps 10. These taps are connected to the various points of the apparatus which require D. C. voltage, such as the plates and grids of tubes. If desired some of the taps may be connected directly to the secondary 8 so as to supply A. C. voltage for vacuum tube filaments as required. For the sake of simplicity the connections between these taps and the various plates, grids and filaments are not shown, it being understood that wherever a vacuum tube is diagrammatically illustrated, suitable connections are provided to supply the necessary voltages for its operation.

The electrical arrangement inside of the rectangle 11 represents a thyratron oscillator arranged to produce pulses. As will be understood, this is merely a gas filled tube, the frequency of the output of which is controlled by controlling the voltage on its grid 12. According to the present invention the voltage on grid 12 is controlled by the values to be measured in the manner hereinafter described. The output of the oscillator is delivered to a high pass filter 13, which in turn is connected to the conductor 2 ahead of the primary 6. This filter is provided to prevent the supply current from alternator 3 from entering the oscillator circuit, it being understood that the frequency of the supply current will ordinarily be about 60 cycles, whereas the frequency of the oscillator output will generally be several hundred or more cycles.

There are illustrated symbolically in Figure 1 a plurality of conductive elements 14, 15, 16 and 17, which in practice are spaced rings mounted on the outer wall of the chamber 1. For one spread, elements 14 and 15 are connected together through the primary 18 of a transformer. For a different spread elements 14 and 16 are connected together through the primary 19 of a transformer. For a third spread elements 14 and 17 are connected together through the primary 20 of a transformer. The primaries 18, 19 and 20 have corresponding secondaries 21, 22 and 23, respectively. Connected to each of these secondaries is a rectifying tube 24 and a low pass filter 25. This filter is required because the signals picked up by the probes are A. C. and it is desired to prevent their passage to the oscillator 11, while permitting the passage of the output of the rectifying tubes 24.

Connected to each filter is a voltage divider 26. One terminal 27 of each divider is connected to ground through ring 7, while the tap off 28 terminates in a brush 29. Arranged adjacent each brush 29 is a second brush 30, which is electrically connected to the grid 12 of the oscillator tube.

Each pair of brushes 29 and 30 is arranged to bear on the periphery of a disc. There are three of these discs numbered 31, 32 and 33, respectively, mounted on a shaft 34 of a motor 35, which is driven by the power supplied by alternator 3. At the surface there is a similar motor 36, also driven by alternator 3. Motors 35 and 36 are synchronous motors which move in unison. Driven by the motor 36 at the surface are three discs corresponding to 31—33, indicated by numerals 37, 38 and 39, 37 corresponding to 31, 38 to 32 and 39 to 33. Each of the discs has a segment 40 of conductive material, the discs otherwise being made of insulating material, such as Bakelite. The conductive portions of the respective discs are spaced from each other angularly, the angular distance between the respective discs in the particular representation shown being 120°. With the discs properly adjusted and the motors operating, the contacts on disc 31 will engage conductive segment 40 at the same time that contacts at the surface will engage the conductive segment 40 of disc 37, the contacts will engage segment 40 of disc 32 at the same time as contacts at the surface engage segment 40 on disc 38, etc.

At the surface, conductor 2 is connected to a high pass filter 41, one outlet terminal of which is connected to brushes 42, of which there is one for each of discs 37, 38 and 39, while the other terminal is connected to a ground line. This high pass filter is provided to prevent the current from alternator 3 from going to the recording system, while permitting the signals from conductor 2 to reach this system.

For each brush 42 there is a corresponding brush 43 electrically connected to one input terminal of a frequency meter 44, the other input terminal of which is connected to ground.

The output of each frequency meter is delivered to a recording galvanometer 45. These galvanometers are of the type in which a beam of light controlled by the value to be measured plays on a sensitized strip of paper which is driven by the sheave over which the cable 2 is trained, so that the values recorded are automatically correlated with depth.

By suitable selection of the synchronous motors and of the alternator 3 the speed of the commutators of discs 31—33 and 37—39, may be made so great with respect to the rate of travel of the chamber 1 along the borehole that for practical purposes the measurements from the various probe electrodes 14—17 are substantially simultaneous. A practical limitation on the speed at which the commutators can be driven is that there must be a sufficient closed circuit period for each electrode spacing to permit the value to be measured by that spacing to actuate the frequency meter which is to record that value. Thus, in order to relate the measurements with the various electrode spacings as nearly as possible to the same depth it is desirable to increase the ratio of commutator speed to rate of travel of the chamber 1 by decreasing the latter.

In order to measure the natural earth potential in the system shown, there is connected across the condenser 5 a D. C. galvanometer 46 of the recording type. It is preferred to interpose an amplifier 47 between the galvanometer and the condenser.

In order to measure the single electrode impedance, which is the impedance of the earth to the current applied by conductive element 7, there is connected to the cable 2 a voltmeter 48 through an amplifier 49. This galvanometer 48 will then record the A. C. voltage drop in the circuit which includes the earth, conductor 2 and conductive element 7. As before stated, the current in this circuit is maintained substantially constant so that the voltage variation will be a measure of the impedance of the earth to the current.

Thus, in the system described, there will be made simultaneously a record of the natural earth potential, the single electrode impedance, and the A. C. potential between one or more selected spreads of conducting rings mounted on the borehole chamber. When the contacts 29 and 30 of commutator 31 are shortcircuited, the contacts 42 and 43 of commutator 37 are simultaneously shortcircuited, and the voltage difference between elements 14 and 17 is recorded. When the contacts 29 and 30 of commutator 32 are shortcircuited, the contacts 42—43 of commutator 38 are simultaneously shortcircuited, and the voltage difference between elements 14 and 16 is recorded. In the same way the voltage difference between elements 14 and 15 is separately recorded. It will be understood that these voltage differences are actually reflected as changes in frequency in the output of oscillator 11 and that it is these frequency changes which are measured.

Figure 2:
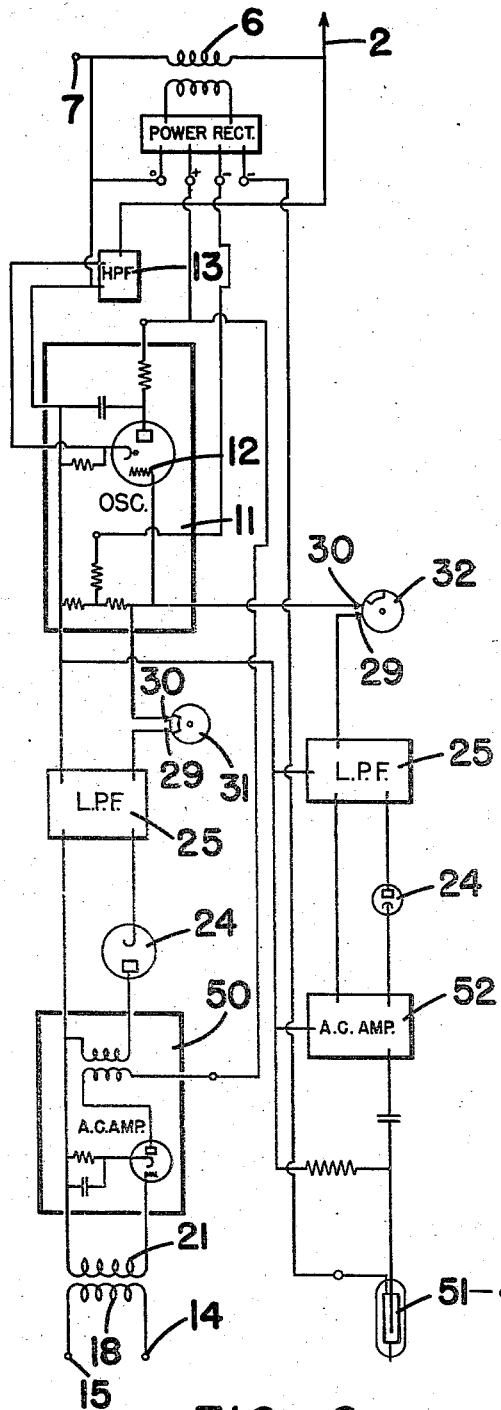
Figure 2 is a schematic view of a circuit suitable for the borehole chamber in another embodiment of the present invention.

In Figure 2 is shown the arrangement to be used in the borehole chamber when it is desired to record simultaneously natural earth potential, single electrode impedance, the A. C. potential difference between spaced conducting elements and the radioactivity of the formations traversed. As in the arrangement shown in Fig. 1, 2 designates the conductor connected with the surface, 6 the primary of the transformer in the borehole chamber, and 7 the conductive element through which the charging current is transmitted to the formations. Numerals 14 and 15 designate spaced conductive elements arranged on the borehole chamber and connected to each other through primary 18, the secondary 21 of which is connected to the rectifier tube 24, in this case through an A. C. amplifier which comprises the elements embraced in the square 50. Likewise, as in Figure 1, the rectifier tube is connected to a filter 25, one output of which terminates in a brush 29. There is also provided a brush 30 connected to the grid 12 of the tube of oscillator 11. As shown in Figure 1 the brushes 29 and 30 frictonally engage the periphery of commutator 31. The output of the osciliator is connected to conductor 2 through a high pass filter 13.

In addition, in this modification there is provided in the chamber a counter tube 51, which is commonly known as a Geiger-Müller counter. As is known this counter requires for its operation a fairly high D. C. voltage which in this case is supplied by the rectifier 9 by a suitable connection between the counter tube and one of the taps 10. The output of the counter is delivered to an A. C. amplifier 52. The amplifier converts the unidirectional pulses from the counter into pulses which have characteristics of an alternating current. For this reason the output of the amplifier is passed through a rectifier and thence through a low pass filter to contact point 29 of the commutator 32. The other contact point 30 of this commutator is connected to the grid of the oscillator tube. Because the pulses generated by the counter tube are not all of the same size it is preferred in practice to interpose a levelling device of the type commonly found in frequency meters between the amplifier 52 and the rectifier 24.

It will be understood that the arrangement at the surface in this embodiment will be the same as that shown in Figure 1, with the exception, of course, that one of the channels has been omitted. It will be apparent that this other channel, or even more channels can be included in the arrangement shown in Figure 2 if desired.

Figure 3:
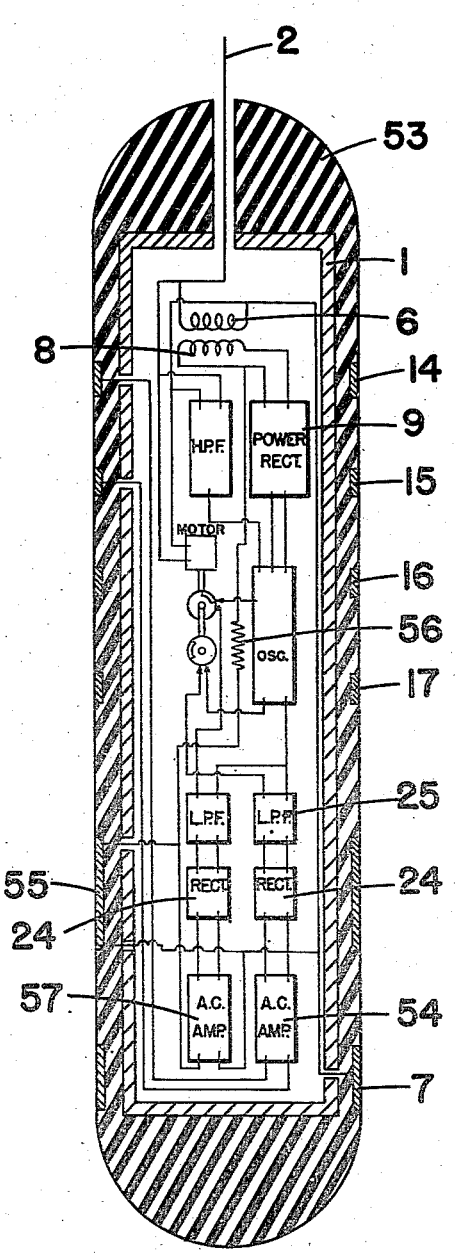
Figure 3 is a vertical section of one type of borehole chamber with a diagrammatic representation of a suitable circuit for said chamber.

In Figure 3 there is illustrated the form which the borehole chamber commonly takes. In this case the values recorded are the natural earth potential, the single electrode impedance, the A. C. potential difference between spaced conducting members on the chamber, and the temperature. Referring to the drawing, the chamber 1 is a metal chamber, which will, of course, be of sufficient strength to withstand the pressures encountered in a borehole. This metal chamber is covered with a layer of insulating material 53, which may be Bakelite or rubber. Arranged in spaced circumferential grooves on the outer surface of the insulating material are rings 14, 15, 16 and 17, corresponding to the conductive elements symbolically indicated in Figure 1. For the sake of simplicity only the connections between rings 14 and 15 are shown in Figure 3. At the lower end of the chamber in a suitable circumferential groove is the charging electrode 7, to which conductor 2 is connected.

It will be observed that the conductors from elements 14 and 15 are connected, in Figure 3, to an amplifier 54. This amplifier will include the transformer 18—21, shown in Figures 1 and 2. The amplifier output is delivered to rectifier 24, the output terminals of which are connected to filter 25, the remainder of the channel being the same as illustrated in Figures 1 and 2.

In this embodiment one of the channels composed of a rectifier, filter, commutator and oscillator is utilized for a temperature measurement. To this end there is arranged on the surface of the insulating material 53 a low resistance band of copper 55, which is connected to the secondary 8 of the power transformer ahead of the rectifier 9 through a high resistance 56. The band 55 is connected across the input of amplifier 57, the output of which is delivered to a rectifier 24 and introduced into the channel in the manner heretofore described.

Variations in temperature will result in variations in the voltage drop across the band 55. As has been stated, the amplifier 57 will include a transformer across the primary of which the band 55 will be connected. It will be desirable to make the impedance of the primary substantially the same as that of the band 55, and the impedance of the secondary of this transformer substantially the same as the rest of the circuit in which it is connected.

In the foregoing description an arrangement has been described in which various values are utilized to vary the frequency of the output of an oscillator. Instead of using the value to be measured for frequency modulation of the base frequency of the oscillator, it will be apparent that these values to be measured can also be utilized to modulate the amplitude of the oscillator output. Ordinarily, of course, this amplitude modulation will be effected by applying the value to be measured to the output of the oscillator, thereby changing the load on the oscillator. When amplitude modulation is employed the surface equipment will include a demodulator, such as an ordinary radio receiving set, and the modulations will be amplified and recorded.

The nature and objects of the present invention having been thus described and illustrated, what is claimed as new and useful and is desired to be secured by Letters Patent is:

1. An apparatus for logging boreholes by making measurements of the variation with depths of a plurality of different kinds of properties of the strata traversed by the boreholes comprising a bomb adapted to be lowered into said bore hole, an oscillator arranged in said bomb, a plurality of means arranged in said bomb for measuring a plurality of properties in said bore hole, means for connecting each of said measuring means, in sequence, to said oscillator in such a way as to modulate the output thereof, means for transmitting the output of said oscillator to the surface, and means at the surface for relating different portions of said oscillator output to said different measuring means in said bomb.

2. An apparatus for logging boreholes by making measurements of the variation with depth of a plurality of different kinds of properties of the strata traversed by the boreholes which comprises a bomb adapted to be lowered into said bore hole, an oscillator arranged in said bomb, a plurality of measuring means carried by said bomb for measuring different properties in said bore hole, commutator means for electrically associating said measuring means, in sequence, with the output of said oscillator, a conductor for transmitting the output of said oscillator to the surface, commutator means at the surface for conducting different portions of said oscillator output to different recording means, and synchronous motors arranged at the surface and in said bomb for driving the commutator means at the surface in synchronism with the commutator means in said bomb.

3. An apparatus according to claim 2 in which a source of power current of widely different frequency from the output of said oscillator is connected at the surface to the conductor which conducts the output of said oscillator to the surface in order to supply power for the operation of the measuring means in the bomb.

4. Apparatus according to claim 2 in which at least one of the measuring means in said bomb is operated on alternating current and at least one is operated on a direct current potential, a source of alternating current is connected at the surface to the conductor for transmitting an oscillator output to the surface, said conductor is connected directly in said bomb to the measuring means operating on alternating current and is connected through a rectifier in said bomb to the measuring means operating on a direct current potential.

ALEX FROSCH.

REFERENCES CITED

The following references are of record in the file of this patent:

UNITED STATES PATENTS

| Number | Name | Date |
|---|---|---|
| 1,928,969 | Kuffel | Oct. 3, 1933 |
| 1,928,970 | Johnston | Oct. 3, 1933 |
| 1,938,534 | Peters | Dec. 5, 1933 |
| 2,018,080 | Martienssen | Oct. 22, 1935 |
| 2,132,807 | Rust et al. | Oct. 11, 1938 |
| 2,220,070 | Aiken | Nov. 5, 1940 |
| 2,220,788 | Lohman | Nov. 5, 1940 |
| 2,225,668 | Subkow et al. | Dec. 24, 1940 |
| 2,255,754 | Beers | Sept. 16, 1941 |
| 2,271,951 | Pearson et al. | Feb. 3, 1942 |
| 2,288,278 | Howell | June 30, 1942 |
| 2,288,876 | Arnold | July 7, 1942 |
| 2,295,738 | Gillbergh | Sept. 15, 1942 |
| 2,317,259 | Doll | Apr. 20, 1943 |
| 2,364,957 | Douglas | Dec. 12, 1944 |

OTHER REFERENCES

"Geophysical Exploration," Heiland, pp. 825–829, published 1940 by Prentice Hall Co., N. Y.